United States Patent [19]

LeVee

[11] Patent Number: 4,669,773
[45] Date of Patent: Jun. 2, 1987

[54] ROOF MOUNTED STORAGE DEVICE

[76] Inventor: Robert C. LeVee, 12719 NE. 7th Pl., Vancouver, Wash. 98684

[21] Appl. No.: 783,355

[22] Filed: Oct. 3, 1985

[51] Int. Cl.⁴ .......................... B60R 5/00; B60R 9/04
[52] U.S. Cl. .................................. 296/37.7; 296/168; 296/37.8; 292/7
[58] Field of Search ............... 296/37.1, 37.7, 37.8, 296/156, 164, 165, 168, 218; 312/247; 293/27; 292/7

[56]  References Cited
U.S. PATENT DOCUMENTS

| 1,596,073 | 8/1926 | Berglund | 211/202 |
| 1,819,516 | 8/1931 | Kelly | 312/247 |
| 2,506,086 | 5/1950 | Jess | 312/247 |
| 3,494,656 | 2/1970 | McIntire | 296/156 |
| 3,547,480 | 12/1970 | Ward | 296/164 |
| 3,758,147 | 9/1973 | Burton | 296/156 |

FOREIGN PATENT DOCUMENTS 129982  1/1901  Fed. Rep. of Germany ........ 293/27

Primary Examiner—Robert B. Reeves
Assistant Examiner—Glenn B. Foster
Attorney, Agent, or Firm—Kolisch, Hartwell & Dickinson

[57]  ABSTRACT

A storage pod is fixedly mounted externally on the roof of a vehicle in alignment with a roof opening framed by peripheral molding in which a ceiling closure panel, is seated in its upper position. The closure panel is suspended from the top of the storage pod by lazy long linkages for vertical displacement against spring bias to a lowered position maintaining the panel level within the vehicle enclosure. The ceiling closure panel is releasably locked in its upper position seated in the peripheral molding and acts as a loading shelf when unlocked.

13 Claims, 8 Drawing Figures

ROOF MOUNTED STORAGE DEVICE

BACKGROUND OF THE INVENTION

This invention relates generally to vehicle storages systems, and more particularly to storage pods mounted on the roofs of recreational vehicles.

Storage pods presently mounted externally on the roofs of recreational vehicles, such as trailers and motor homes, are accessible by means of a ladder attached externally to the rear end of the vehicle. To load or unload the storage pod, one must climb the ladder and unlatch a closure lid associated with the storage pod to thereby provide access to its interior storage space. Storage loading and unloading operations have therefore been physically taxing under the best conditions and most undesirable during inclement weather conditions.

The concept of providing storage space within the roof or ceiling of a vehicle enclosure with internal access thereto is, of course, well known as disclosed, for example, in U.S. Pat. Nos. 2,236,428 and 4,469,365. Ceiling suspended trays within a vehicle enclosure is also known as disclosed in U.S. Pat. No. 2,947,585. However, despite the crowded nature of the prior art related to recreational vehicles and vehicles storage systems, the teachings in the aforementioned patents have not been adapted to facilitate storage access and loading problems associated with storage pods externally mounted on the roof of recreational vehicles.

It is, therefore, an important object of the present invention to provide improved access and loading facilities for external roof mounted storage pods on recreational vehicles through the interior ceiling of the vehicle enclosure.

SUMMARY OF THE INVENTION

In accordance with the present invention, a storage pod housing having no lidded opening is fixedly mounted on top of the roof of a vehicle with its open bottom aligned with an opening formed in the roof. The roof opening is framed by a peripheral molding attached to the storage pod housing and the vehicle ceiling. The molding has a shouldered recess portion seating, a ceiling closure panel which also serves as a loading shelf. Lazy tong linkages suspend the closure panel from the top portion of the storage pod housing and guide its vertical displacement in a level condition between an upper position seated in the peripheral molding and a lowered shelf loading position. Counterbalancing springs reduce the manual effort required to lower or raise the closure shelf panel between its upper and lowered positions. The shelf panel is grasped by means of a knob rotatably mounted on its underside and is locked in its upper position by locking elements projecting through slots in the peripheral molding. The locking elements are retractable under control of the knob.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
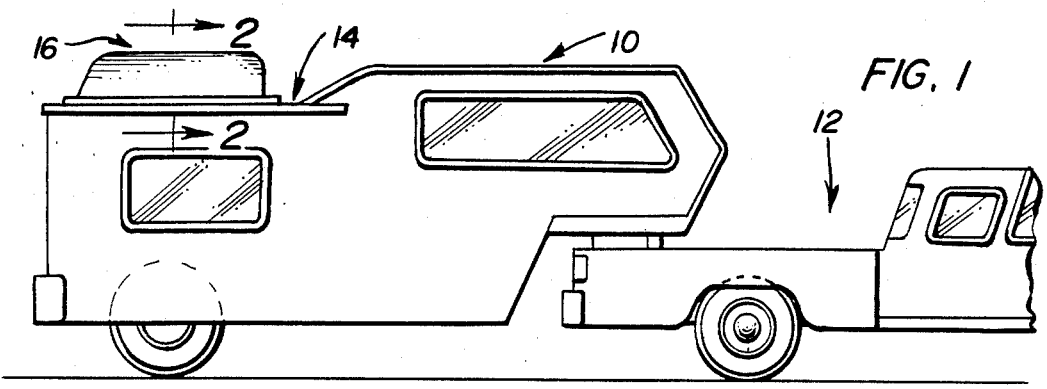
FIG. 1 is a side elevational view of a storage pod mounted on a typical recreational vehicle in accordance with the present invention.

Referring now to the drawings in detail, FIG. 1 illustrates a typical recreational vehicle 10 of the trailer type hitched for towing to the rear end portion of the bed of an automotive truck 12. The vehicle 10 has a relatively flat roof portion 14 on which a storage pod 16 is fixedly mounted. The storage pod projects upwardly from the roof portion 16 to enclose a storage space 18 thereabove as indicated in FIGS. 2, 4, 5 and 6.

Figure 2:
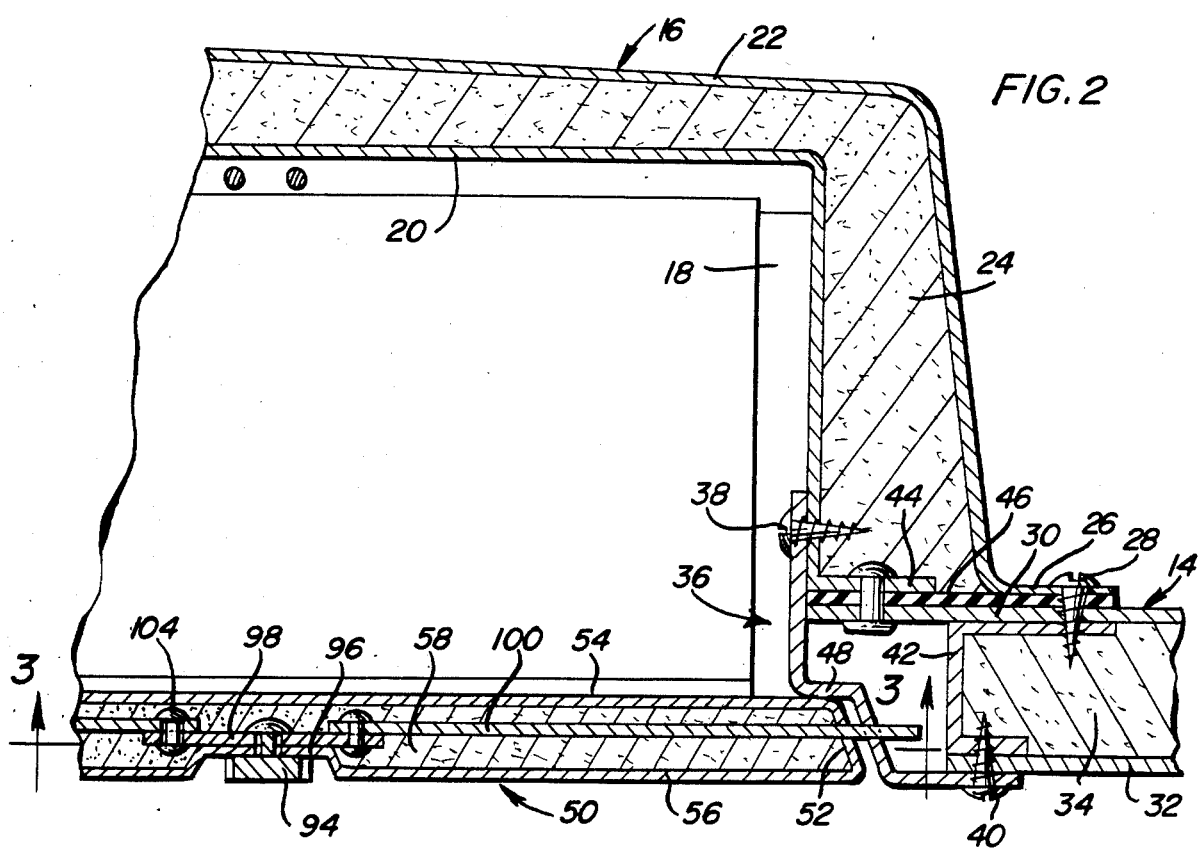
FIG. 2 is an enlarged partial sectional view take substantially through a plane indicated by section line 2—2 in FIG. 1.
Figure 5:
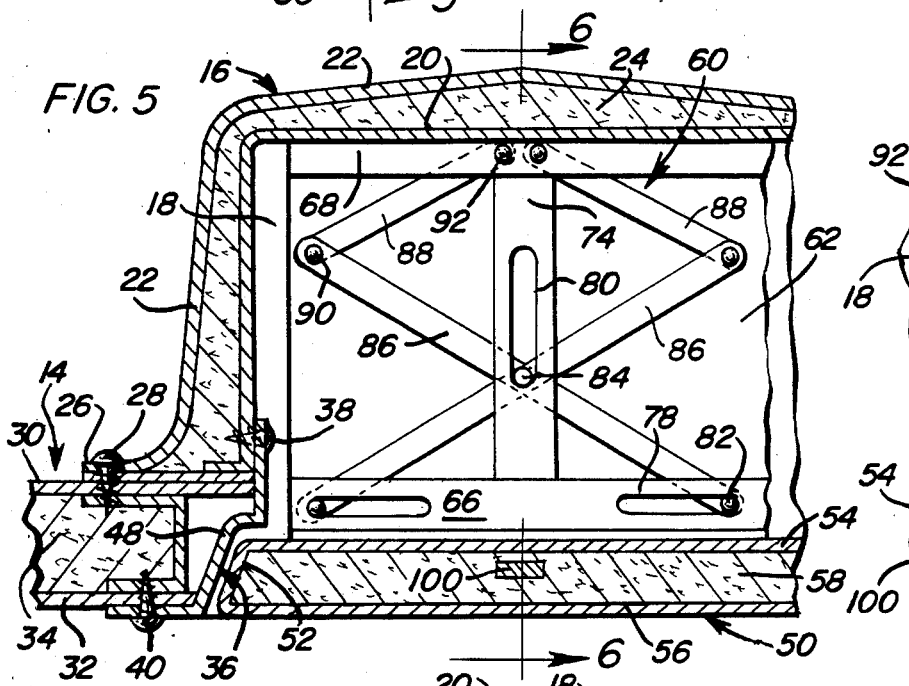
FIG. 5 is a partial sectional view taken substantially through a plane indicated by section line 5—5 in FIG. 4 showing the closure panel in its upper locked position.
Figure 6:
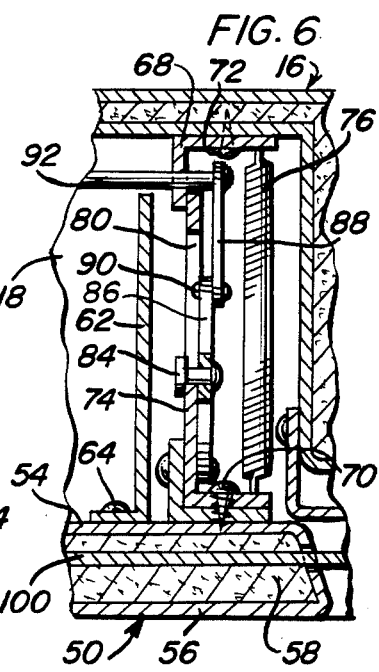
FIG. 6 is a partial sectional view taken substantially through a plane indicated by section line 6—6 in FIG. 5.

As shown in FIGS. 2 and 5, the storage pod 16 is formed from an insulated assembly having an inner skin 20 defining the storage space 18 and an outer skin 22. Insulation 24 occupies the space between skins 20 and 22. A base flange 26 is formed at the bottom of the outer skin through which the storage pod is secured to the roof portion 14 by a plurality of screw fasteners 28. The roof portion 14 is typically formed by a roof panel sheet 30 through which the fasteners 28 extend, a ceiling panel sheet 32 spaced therebelow and insulation between the roof and ceiling sheets. In accordance with the present invention, the storage pod housing assembly has no access openings except for the bottom surrounded by the peripheral base flange 26 sealingly secured throughout to the roof portion 14. Such open bottom of the storage pod is aligned with an opening formed in the roof portion. The roof opening is peripherally framed by a molding 36 secured by screw fasteners 38 to the inner skin 20 of the storage pod housing and by fasteners 40 to the ceiling sheet 32 of the roof portion. A peripheral channel-shaped retainer 42 is inserted into the roof assembly at the opening in spaced relation to the molding 36 to hold the insulation in the roof. The fasteners 28 and 40 extend through the upper and lower flanges of the retainer to hold it in place. The roof panel sheet 30 at the roof opening extends somewhat beyond the retainer channel 42 into abutment with molding 36 and underlying a bottom flange 44 projecting from the inner skin 20 of the storage pod housing. Rivet-type fasteners interconnect the flange 44 with the extension of the roof panel sheet. A sealing strip 46 may be sandwiched between the roof panel sheet 30 and the flanges 44 and 26 of the inner and outer skins to effectively seal the roof opening.

Figure 4:
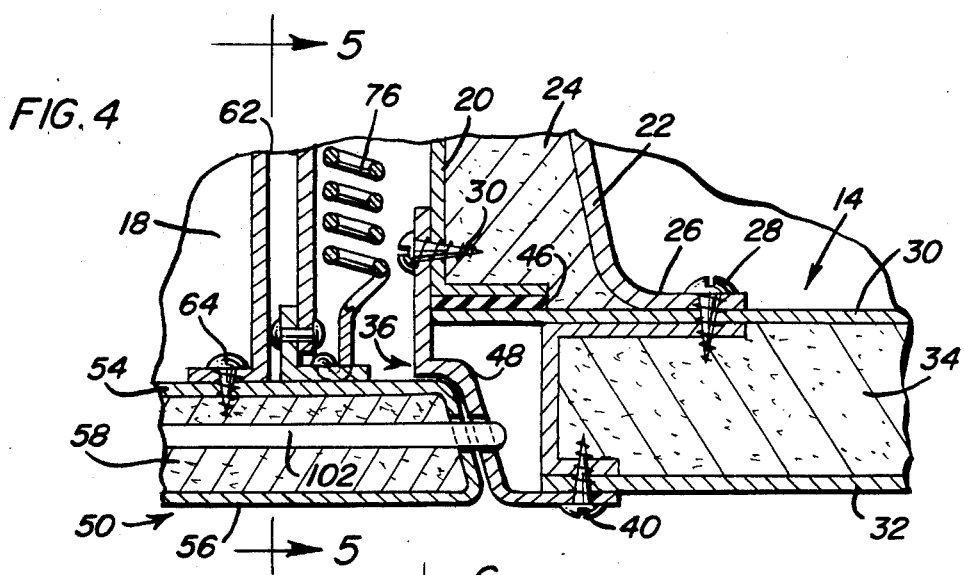
FIG. 4 is an enlarged partial sectional view taken substantially through a plane indicated by section line 4—4 in FIG. 3.

With continued reference to FIGS. 2, 4 and 5, the peripheral molding 36 includes a shouldered recess portion 48 adapted to seat a ceiling closure panel 50 in its upper closed position as shown. The closure panel is of a generally rectangular shape in a horizontal plane and has beveled edge portions 52 interconnecting upper and lower parallel spaced panel sheets 54 and 56 enclosing a body of insulation 58. The closure panel 50 will accordingly fit within the roof opening framed by the molding 36 when seated in its upper position within the recessed portion 48. In such position, panel 50 will be almost flush with the ceiling panel sheet 32 of the roof assembly 14. In the lowered position of the closure panel 50, the opening in the roof assembly is exposed and the panel 50 serves as a loading shelf onto which various items may be placed for loading into the storage space 18 by subsequent elevation of the closure panel to the upper position. Such items may also be unloaded from the storage by lowering the closure panel from its upper closed position. Vertical displacement of the closure panel between its upper and lowered positions is guided by a pair of panel suspending linkage mechanisms generally referred to by reference numeral 60 connected to the closure panel adjacent opposite longitudinal ends thereof. The storage space is separated from the mechanisms 60 by panels 62 secured by fasteners 64 to the upper sheet 54 of the closure shelf panel 50.

Figure 5A:
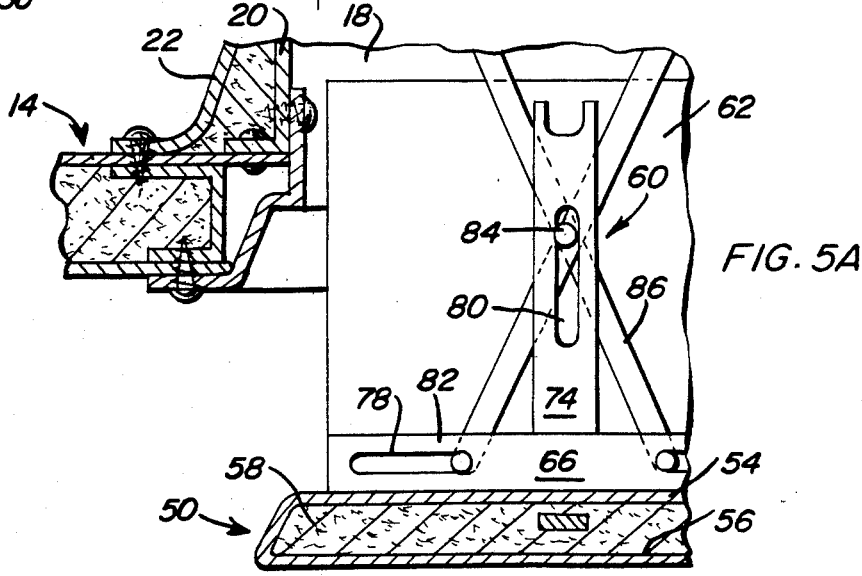
FIG. 5A is a sectional view similar to a portion of FIG. 5, but showing the closure panel in a lowered position.

Each of the linkage mechanisms 60 includes a linkage mount, which, in the preferred embodiment, takes the form of a pair of horizontally elongated angle bars 66 and 68, respectively, secured to the closure shelf panel 50 and the top portion of the storage pod housing by fasteners 70 and 72. One of the fasteners 70 also secures the lower flange end of a vertical guide bar 74 centrally to the lower angle bar 66 for movement with the closure shelf panel 50. A pair of counterbalancing coil springs 76 are interconnected at opposite axial ends to the horizontal bars 66 and 68 to bias the closure shelf panel 50 upwardly to the upper closed position. A pair of horizontally elongated slots 78 are formed in the lower bar 66 while a vertical slot 80 is formed in the vertical guide bar 74. The slots 78 and 80 guide movement of slidable connecting pins 82 and 84 for a pair of links 86 of a lazy tong or scissor linkage which also includes a pair of lever elements 88 pivotally connected by pins 90 to the links. The lever elements 88 of both linkage mechanisms 60 are pivotally interconnected and anchored to the storage pad by closely spaced pivot shafts 92 extending between the upper angle bars 68. The linkages will accordingly maintain the closure shelf panel 50 level as it is displaced along a vertical path guided by the slidable pin connection 84 in the slot 80 of the guide bars 74. The closure shelf panel 50 may therefore be pulled downwardly against the bias of springs 76 to a lowered position as shown in FIG. 5A and pushed upwardly to the upper closed position for safely unloading or loading the storage space with the assistance of the springs 76.

Figure 3:
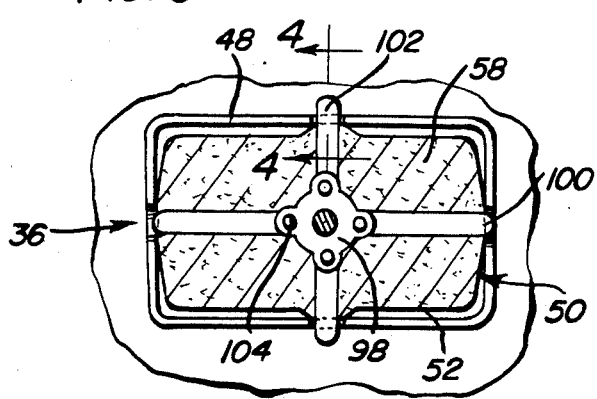
FIG. 3 is a partial sectional view taken substantially through a plane indicated by section line 3—3 in FIG. 2 showing the closure panel in a locked position.
Figure 3A:
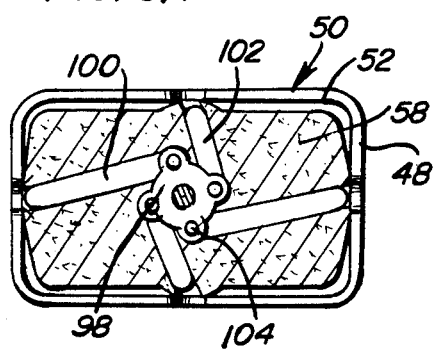
FIG. 3A is a partial sectional view similar to FIG. 3 showing the closure panel in a lock released condition.

The closure shelf panel 50 is manually grasped to effect the aforesaid vertical displacement through a knob 94 as more clearly seen in FIG. 2, the knob being rotatably mounted within a centrally recessed portion 96 of the panel 50. The knob is connected to a lever plate 98 within the panel 50 for displacement of two pairs of locking elements 100 and 102 pivotally connected by pins 104 to the lever plate. The two pairs of locking elements extend through the panel 50 at right angles to each other. In the extended positions of the locking elements as more clearly seen in FIG. 3, the locking elements project through aligned slots in the edge portion 52 of panel 50 and in the molding 36 to lock the panel in its upper closed position. The knob 54 may then be simply rotated 90° to retract the locking elements into the panel 50 as shown in FIG. 3A in order to release the panel for downward displacement by a pull exerted on the knob 94.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicular enclosure having a roof and means in the roof forming an opening therein, a storage pod comprising:
    a weather tight enclosure having an opening on the bottom side thereof conformal with the opening in the roof;
    a closure device for simultaneously closing the bottom of the pod and the opening in the roof;
    a linkage mechanism operatively mounting the closure device for displacement between an upper position closing the opening and a lowered position exposing the opening within the vehicular enclosure; said linkage mechanism including a pair of opposed scissor linkages constructed and arranged to maintain said closure device in a substantially level orientation as said closure device is vertically displaced between said upper position and said lowered position;
    wherein said linkage mechanism includes opposed enclosure linkage mounts fixed to said enclosure and corresponding opposed closure device linkage mounts fixed to said closure device; each of said scissor linkages extending between an enclosure linkage mount and a corresponding closure device linkage mount and including lever elements at one end thereof; said mechanism further including a pair of pivot shafts rotatably fixed between said opposed enclosure linkage mounts, each shaft operatively interconnecting corresponding opposed lever elements thereby to maintain substantially equal extension of said opposed scissor linkages.

2. The combination of claim 1 wherein said linkage mechanism further includes a pair of opposed elongate vertical guides, each guide having a slot therein intermediate its ends; and each of said scissor linkages includes a pin connector at its hinge point, said pin connector being constructed and arranged to project through said slot and to be slidable therealong.

3. The combination of claim 1 wherein said linkage mechanism includes counterbalancing spring means operatively connected between said enclosure and said closure device biasing the closure device upwardly to the upper position.

4. The combination of claim 1 wherein the opening in the roof includes a peripheral molding member having a recessed shoulder portion seating the closure device flush within the roof in the upper position.

5. The combination of claim 1 which includes means for releasably locking said closure device in the upper position.

6. In combination with a vehicular enclosure having a roof and means in the roof forming an opening therein, a storage pod comprising:
a weather tight insulated enclosure having an opening on the bottom side thereof conformal with the opening in the roof;
a closure device for simultaneously closing the bottom of the pod and the opening in the roof;
a linkage mechanism operatively mounting the closure device for displacement between an upper position closing the opening and a lowered position exposing the opening within the vehicular enclosure; said linkage mechanism including a pair of opposed scissor linkages constructed and arranged to maintain said closure device in a substantially level orientation as said closure device is vertically displaced between said upper position and said lowered position; said linkage mechanism including counterbalancing spring means operatively connected between said enclosure and said closure device biasing the closure device upwardly to the upper position;
wherein said linkage mechanism includes opposed enclosure linkage mounts fixed to said enclosure and corresponding opposed closure device linkage mounts fixed to said closure device; each of said scissor linkages extending between an enclosure linkage mount and the corresponding closure device linkage mount and including lever elements at one end thereof; said mechanism further including a pair of pivot shafts rotatably fixed between said opposed enclosure linkage mounts, each shaft operatively interconnecting corresponding opposed lever elements thereby to maintain substantially equal extension of said opposed scissor linkages.

7. The combination of claim 6 wherein said linkage mechanism further includes a pair of opposed elongate vertical guides, each guide having a slot therein intermediate its ends; and each of said scissor linkages includes a pin connector at its hinge point, said pin connector being constructed and arranged to project through said slot and to be slidable therealong.

8. The combination of claim 6 wherein the opening in the roof includes a peripheral molding member having a recessed shoulder portion seating the closure device flush within the roof in the upper position.

9. The combination of claim 8 which includes locking means for releasably locking said closure device in the upper position, said locking means having at least one elongate element carried on said closure device; said recessed shoulder portion having at least one slot therein for receiving said elongate element therethrough when said closure device is in its upper position.

10. In combination with a vehicular enclosure having a roof and means in the roof forming an opening therein, a storage pod comprising:
a weather tight enclosure having an opening on the bottom side thereof conformal with the opening in the roof;
a closure device for simultaneously closing the bottom of the pod and the opening in the roof;
a linkage mechanism operatively mounting the closure device for displacement between an upper position closing the opening and a lowered position exposing the opening within the vehicular enclosure; said linkage mechanism including a pair of opposed scissor linkages, opposed enclosure linkage mounts fixed to said enclosure and corresponding opposed closure device linkage mounts fixed to said closure device; each of said scissor linkages extending between an enclosure linkage mount and the corresponding closure device linkage mount and including lever elements at one end thereof, a pair of pivot shafts rotatably fixed between said opposed enclosure linkage mounts, each shaft operatively interconnecting corresponding opposed lever elements thereby to maintain substantially equal extension of said opposed scissor linkages thereby to maintain said closure device in a substantially level orientation as said closure device is vertically displaced between said upper position and said lowered position, each scissor linkage having a hinge point and a pin connector located at said hinge point; said linkage mechanism further including a pair of opposed elongate vertical guides, each guide having a slot therein intermediate its ends, said pin connector being constructed and arranged to project through said slot and to be slidable therealong.

11. The combination of claim 10 wherein said linkage mechanism includes counterbalancing spring means operatively connected between said enclosure and said closure device biasing the closure device upwardly to the upper position.

12. The combination of claim 10 wherein the opening in the roof includes a peripheral molding member having a recessed shoulder portion seating the closure device flush within the roof in the upper position.

13. The combination of claim 10 which includes means for releasably locking said closure device in the upper position.

* * * * *